March 12, 1957 R. E. LEISTER 2,785,310
FREQUENCY-SHIFT TRANSMITTER
Filed May 15, 1953
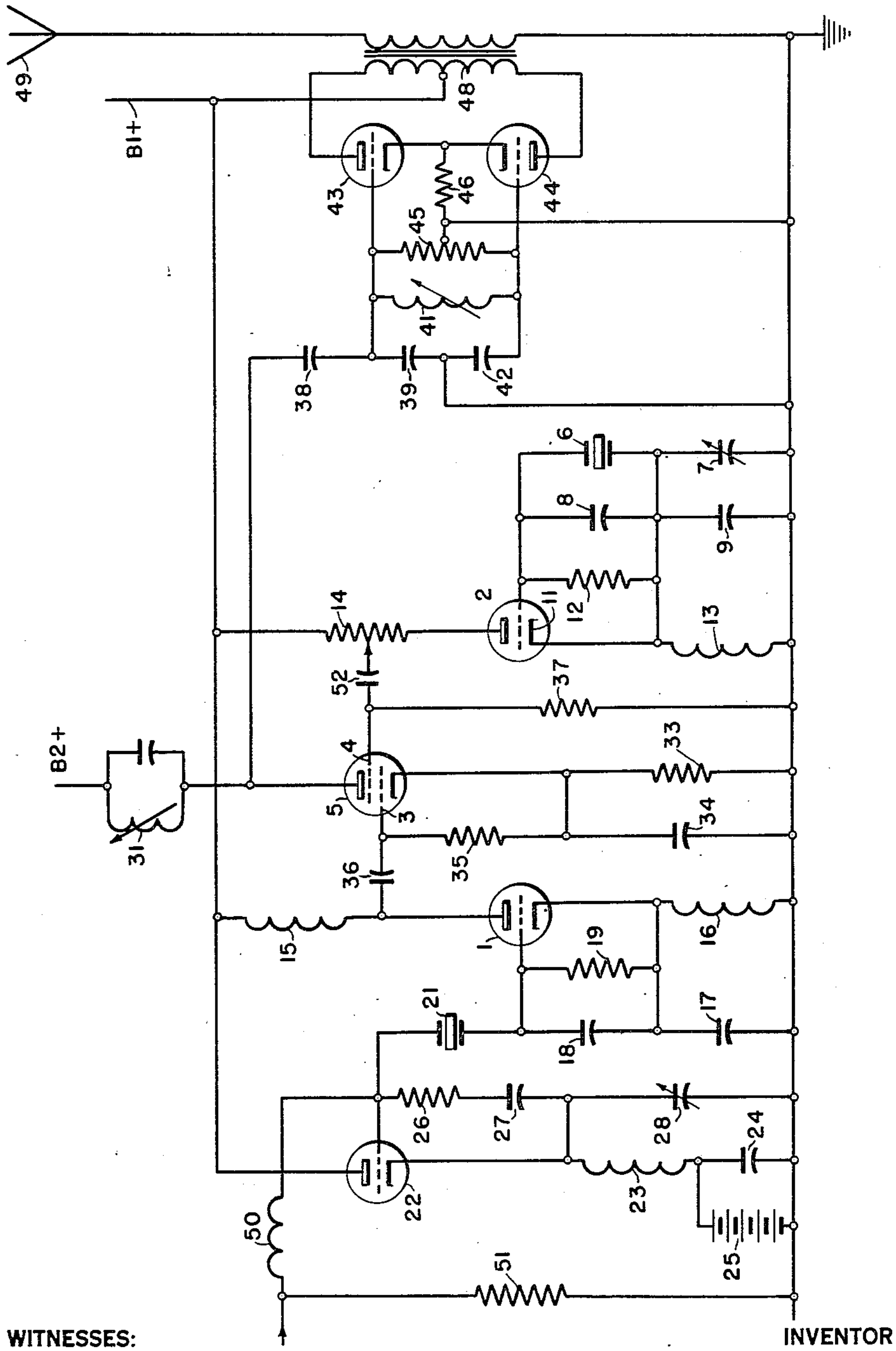
WITNESSES:
John E. Healy
Wm. T. Wofford
INVENTOR
Robert E. Leister.
BY
F. E. Browder
ATTORNEY 2,785,310
Patented Mar. 12, 1957

2,785,310

FREQUENCY-SHIFT TRANSMITTER

Robert E. Leister, Baltimore, Md., assignor to Westinghouse Electric Corporation, East Pittsburgh, Pa., a corporation of Pennsylvania Application May 15, 1953, Serial No. 355,207

3 Claims. (Cl. 250—36)

My invention relates to radio transmitters and, in particular, relates to novel type of frequency-shift generator for signal waves of the type in which dashes, dots or other marks at one frequency are separated by spaces of a slightly different frequency. Such transmission is used for telegraphy, facsimile, remote metering and similar services.

Conventional practice in narrow band frequency-shift transmission today involves the use of generators, the frequency of which is fixed by one or more piezoelectric crystals operating at the carrier frequency. Because the crystal is a highly stable device, the amount of shift is usually fixed at about 0.06 percent of the carrier. When a different carrier is to be used, the amount of frequency shift thus changes too. In many cases, a frequency-shift which is constant regardless of changes in the carrier frequency to be employed would be more desirable. For this reason, my system is arranged to operate with a frequency-shift of approximately 120 cycles per second throughout an operating range of 30 to 200 kilocycles, thereby attaining a more favorable deviation ratio at lower frequencies than is obtained with a shift of 0.06 percent. However, my invention is not restricted to this frequency range. Other novel features of my invention are not limited to a constant frequency-shift but may be employed where a 0.06 percent shift is more desirable as in cases where a narrow frequency-band is more important than high-speed operation. A shift of approximately 250 cycles or greater is also obtainable with this system and in some cases may be desirable.

Where capacitor-inductor tank circuits are relied on to fix the generated frequency, great difficulty is found in maintaining constancy against the effects of temperature changes, humidity changes and the like, so it is not practical to try to employ a circuit of this type. To overcome this difficulty, and the difficulty of trying to obtain sufficient shift of a piezoelectric crystal at the channel frequency, I employ two piezoelectric crystals whose frequencies are different by an amount equal to the channel frequency, but whose frequencies are both higher than the channel frequency. The channel frequency is produced by mixing the two signals and obtaining the difference frequency. The frequency of one of the oscillators is shifted by injecting a quadrature current from a reactance tube, the latter current being modulated with the signals to frequency-shift the output of that crystal generator.

By using crystals whose frequencies are above the channel frequency, it is easy to shift the channel frequency the desired amount. For example, if the crystal to be shifted has a frequency of 1.0 mc., it is necessary to shift its frequency only 0.025% to obtain a 250 cycle shift or .012% to obtain a shift of 120 cycles. If the signal from the 1.0 mc. crystal is mixed with the signal from a 1.04 mc. crystal, a channel frequency of 40 kc. with a shift of 120 cycles is easily obtainable. The circuit could further be expanded to simultaneously shift the two oscillators in opposite directions, and thus obtain twice the amount of shift.

One object of my invention is accordingly to provide a new and improved type of generating frequency-shift generator for communication systems.

Another object is to provide a frequency-shift generator which is of high frequency-stability not subject to variations due to changes in environment temperature, humidity and the like.

Another object is to provide a novel method of varying or adjusting the frequency of a piezoelectric-controlled oscillator.

Yet another object is to provide a frequency-shift generator which is not dependent on variable inductors or capacitors to modulate it or adjusted its frequency.

Yet another object is to provide a frequency-shift generator which is modulated by varying the grid-voltage of an auxiliary tube.

Still another object is to provide a frequency-shift generator which may be arranged to provide a constant frequency-shift over a wide range of operating or carrier frequencies.

Other objects of my invention will become apparent upon reading the following description taken in connection with the drawing, in which the single figure is a schematic circuit diagram of a frequency-shift radio transmitter embodying the principles of my invention.

Referring in detail to the drawing, two crystal-controlled oscillators 1 and 2 generate frequencies which differ by the desired carrier-frequency, are respectively connected to the grids 3 and 4 of a mixer-tube 5. The tube 2 is controlled by the piezoelectric crystal 6 and oscillates at a constant frequency, except insofar as it is adjusted when desired by the variable capacitor 7. The crystal 6 and capacitor 7 are bridged by a pair of capacitors 8 and 9 having their common junction connected to cathode 11 of tube 2. The capacitor 8 is shunted by a grid-leak resistor 12, and the capacitor 9 by an inductor 13 through which the cathode 11 is grounded. The anode of tube 2 is connected through a potentiometer 14 to the positive pole B1+ of a direct-current source having its negative pole grounded.

The tube 1 has its anode connected through an inductor 15 to the pole B1+ and its cathode connected to ground through another inductor 16 which is shunted by a capacitor 17. A capacitor 18 shunted by a grid-leak resistor 19 connects the cathode to the control grid of tube 1, and the latter is connected through a piezoelectric crystal 21, resistor 26, capacitor 27, and capacitor 28 to ground. The anode of reactance-tube 22 is connected to the positive pole B1+ while its cathode is connected through an inductor 23 and a direct-current voltage source 25 to ground. The direct-current voltage source 25 is shunted by capacitor 24. The grid of tube 22 is connected to ground through an inductor 50, and a resistor 51. The grid of tube 22 is also connected to the junction of resistor 26 and piezoelectric crystal 21.

The mixer-tube 5 has its anode connected through a variable inductor 31 shunted by a capacitor 32 to the positive pole B2+ of a direct-current voltage source which has its negative pole grounded. The cathode of tube 5 is connected to ground through a resistor 33 shunted by a capacitor 34, and is connected to the grid 3, which is nearest to it in mixer tube 5, by a resistor 35. The connection of grid 3 through a capacitor 36 to the anode of oscillator 1 will be seen to impress on grid 3 a voltage having the frequency generated by oscillator 1. A connection of the grid 4, which is between grid 3 and the anode of mixer-tube 5, to ground through resistor 37 and to the tap of potentiometer 14 through capacitor 52 will be seen to impress on grid 4 a voltage having the frequency generated by oscillator 2. The combined effect of the grids 3 and 4 will cause a beat-frequency equal to the difference of the frequencies of oscillators 1 and 2 to appear at the anode of mixer-tube 5, this being accentuated by resonating the inductor 31 and capacitor 32 to such beat-frequency.

The anode of mixer-tube 5 is connected to ground through a blocking capacitor 38 and a capacitor 39. The latter is shunted by variable inductor 41 in series with a capacitor 42 which is equal in value to capacitor 39. Capacitor 39, capacitor 42, and inductor 41 constitute a phase splitter circuit. The other terminals of the inductor 41 are connected to grids of a pair of push-pull connected amplifier triodes 43 and 44 which are interconnected by a resistor 45. The midpoint of resistor 45 is connected to the cathodes of tubes 43 and 44 by a cathode resistor 46 and to ground. The anodes of tubes 43 and 44 are interconnected by the primary winding of a load transformer 48 which may supply an output load shown as antenna 49 for illustrative purposes.

The mode of operation of the above-described circuit is as follows. Code signals are impressed by any suitable means between, the junction of inductor 50 and resistor 51, and ground, thereby varying the amplification factor of reactance tube 22 and in turn varying the current flow through the latter. Oscillator 1 oscillates at the resonant frequency of crystal 21 and impresses this frequency on the grid of reactance tube 22. This causes two currents to flow through capacitor 28; the tank current through crystal 21 from oscillator 1, and a current from the cathode of reactance tube 22. This latter current is generated by the quadrature voltage between the grid of reactance tube 22 and ground and is therefore in quadrature with the tank current. The code signals on the grid of reactance tube 22 vary its gain and so vary that quadrature current. The latter has the effect on crystal 21 of a series reactance varying in conformity with the signals, and this reactance varies by a small fraction the frequency at which crystal 21 and tube 1 oscillates. Varying the capacitor 28 adjusts the amount of shift in the frequency of oscillator 1 within a small range of values.

The crystal 6 operates oscillator 2 at a fixed frequency different from that of oscillator 1 by approximately the carrier frequency desired for the output; for example fixed frequency oscillator 2 may operate at 1 megacycle and oscillator 2 at 1.04 megacycles when a carrier frequency of the order of 40 kilocycles is desired for load 49. This frequency results from the beating of the two oscillator frequencies in mixer-tube 5.

Variation of the direct-current voltage of the grid in reactance tube 22 in accord with the code signals shifts the frequency of oscillator 1 and produces the same frequency change in the output to load 49. The amount of this frequency shift resulting from a given direct-current signal voltage may be adjusted over a certain range by varying capacitor 28. The frequency of oscillator 2 may itself be adjusted through a relatively small range by varying capacitor 7.

While I have shown my invention in only one form, it will be obvious to those skilled in the art that it is not so limited, but is susceptible to various changes and modifications without departing from the spirit thereof.

I claim as my invention:

1. A frequency-shift generator comprising a first electrical discharge tube having an anode, a cathode and a control electrode, an inductor shunted by a first capacitor in series with said cathode, a second capacitor connecting said cathode to said control electrode, a channel comprising a piezoelectric crystal in series with a third capacitor, said channel shunting said first and second capacitors, a second electrical discharge tube having an anode, cathode and control electrode and having a potential proportional to current through said piezoelectric crystal impressed between its control electrode and cathode, a second inductor in series with the cathode and anode of said second electrical discharge tube, said third capacitor being connected in a path shunting said second inductor, and means to impress signals on the control electrode of said second electrical discharge tube.

2. A frequency-shift generator comprising a first electrical discharge tube having an anode, a cathode and a control electrode, an inductor shunted by a first capacitor in series with said cathode, a second capacitor connecting said cathode to said control electrode, a channel comprising a piezoelectric crystal in series with a resistor and a third and fourth capacitor, said channel shunting said first and second capacitors, a second electrical discharge tube having an anode, cathode and control electrode and having said resistor and said fourth capacitor connected between its control electrode and cathode, a second inductor in series with a fifth capacitor shunted by a bias voltage source forming a channel which is in multiple with said third capacitor, means for supplying direct current voltage to the anode-to-cathode circuits of both said discharge tubes, and means to impress signals on the control electrode of said second electrical discharge tube.

3. The circuit specified in claim 2 in which said second capacitor is shunted by a resistor.

References Cited in the file of this patent

UNITED STATES PATENTS

| | | |
|---|---|---|
| 1,629,685 | Ditcham | May 24, 1927 |
| 2,298,436 | Usselman | Oct. 13, 1942 |
| 2,426,295 | Born | Aug. 26, 1947 |
| 2,515,030 | Belaskas | July 11, 1950 |
| 2,526,347 | Colladay | Oct. 17, 1950 |